Patented May 8, 1934

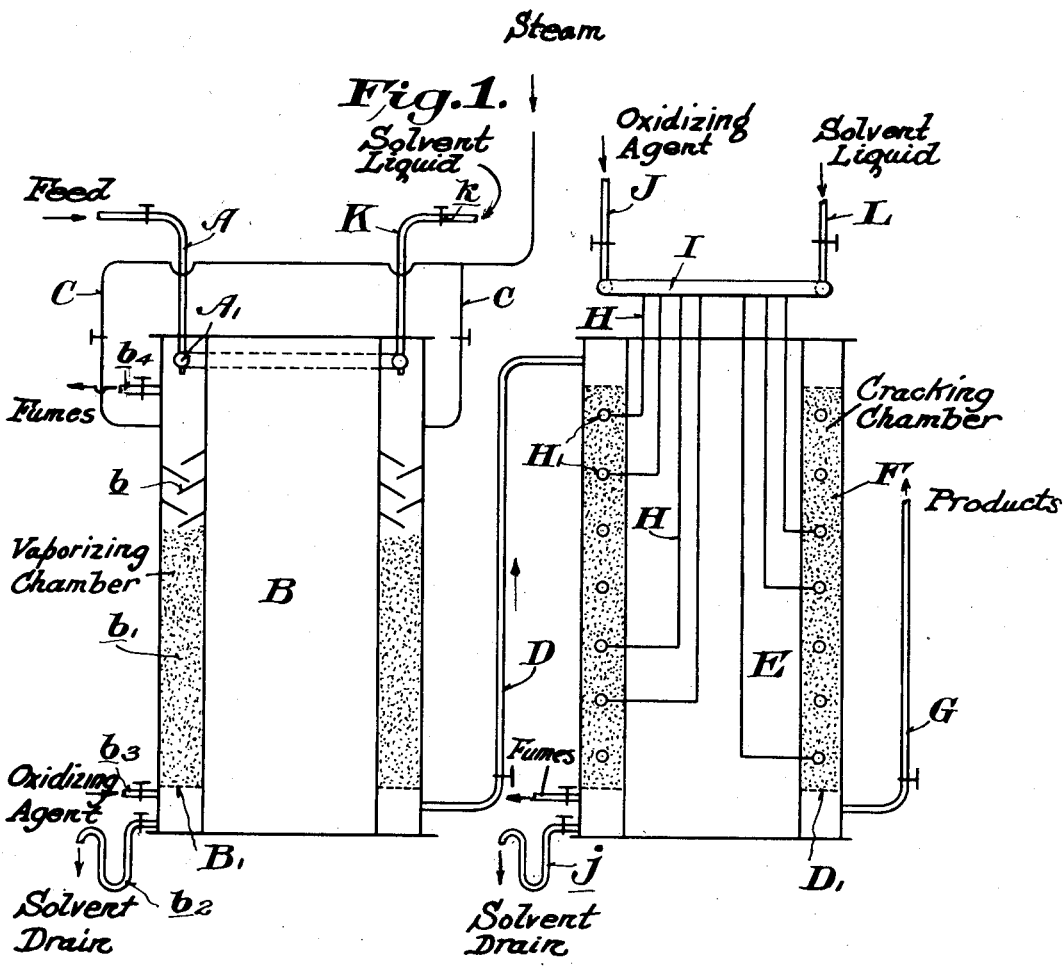

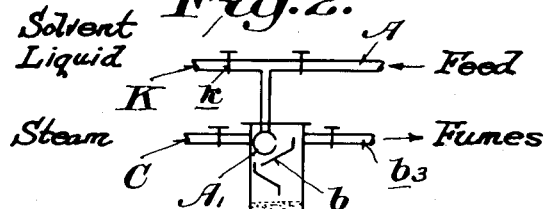
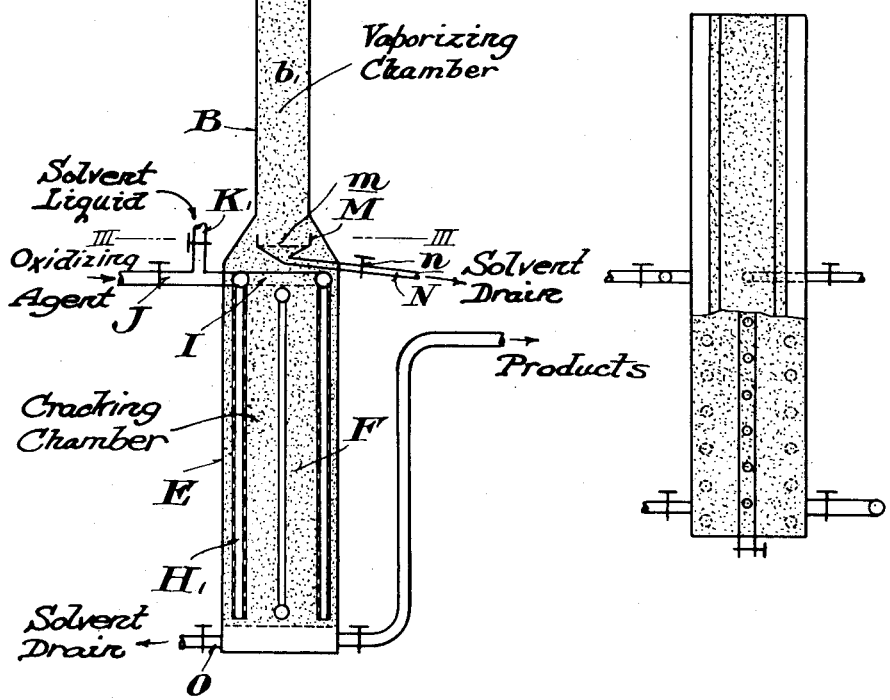
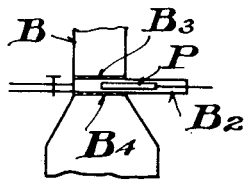

1,957,649

UNITED STATES PATENT OFFICE 1,957,649

PROCESS AND APPARATUS FOR THE TREATMENT OF SODA-TREATED TARS AND OTHER RESIDUES OF THE PETROLEUM INDUSTRY WITH A VIEW TO THE CONVERSION THEREOF INTO LIGHT PRODUCTS

Eugene Houdry, Paris, France, assignor, by mesne assignments, to Houdry Process Corporation, Dover, Del., a corporation of Delaware Application February 16, 1931, Serial No. 516,160
In France November 14, 1930

17 Claims. (Cl. 196—52)

In the treatment of crude petroleum, and more particularly in the manufacture of lubricating oils, by means of these products, there is frequently occasion to neutralize, by bases such as soda, troublesome organic acids (naphthenic or otherwise). From this necessary operation arise soda-treated tars or similar products.

The present invention relates to improvements in the processes and apparatus which form the subject of United States Patent No. 1,806,997 issued May 26, 1931, and of pending patent applications Serial No. 328,013 filed December 22, 1928, Serial No. 440,199½ filed March 31, 1930, and Serial No. 516,159 filed of even date herewith.

In the aforesaid patent and patent applications, previously devised methods and means have been described and illustrated which include catalytic cracking of the products to be converted to be effected, after having previously subjected these products to complete vaporization, mixed with water, in special vaporizing apparatus wherein vaporization is effected in two stages, the second being effected over a porous substance, whereas the first serves to render the product to be treated less fluid for preventing same impregnating too deeply the said porous substance.

When the means above mentioned are applied to the treatment of starting materials such as soda-treated tars for example, it is observed that both the porous substance employed in the vaporizers and sometimes that used in the catalytic cracking chambers become less active at closer intervals of time than is the case when crude residual oil not containing alkaline neutralizing substances, such as soda, are treated in the same manner. It is probable that the soda, more or less converted into sulphate of soda (during the course of regeneration with the aid of a stream of air of the porous and catalytic masses), penetrates into the pores of the substance with which the vaporizer and the catalytic reaction chamber are charged, and it is this progressive penetration which reduces the activity of the said porous substance.

The vaporizers and the catalytic reaction chambers according to the previous processes and apparatus referred to above, comprise means for ensuring periodically the regeneration or the re-activation of the porous substances and catalysts, by the action of a stream of air or other gaseous stream which eliminates the carbon with which these substances are charged.

According to the present invention, the above mentioned apparatus (vaporizers and catalytic reaction chambers) comprise in addition means enabling periodic elimination of alkaline compounds (sulphate of soda and others) with which the porous substance of the vaporizers and the catalysts of the reaction chambers have been able to become charged, to be effected. This elimination is effected by washing with water or with the aid of any other suitable solvent such as alcohol or a solution of alcohol and water or inorganic acids containing an inhibitor or inhibitors for preventing the acids from attacking the walls of the vaporizing and catalytic chambers, or a solution of acids and water and inhibitors. One practical way of carrying out the invention is to effect the said washing by circulating the washing liquid by the pipes which normally serve to effect the regeneration or the reactivation by means of a gaseous stream.

In his aforesaid application Serial No. 516,159, the applicant has described and illustrated a particular form of construction of apparatus, wherein the vaporization and the subsequent catalytic cracking are effected in a vessel in common, the vaporization being effected in an upper compartment and the catalytic cracking in an immediately subjacent compartment, in such manner that the products whatever their degree of vaporization may be, pass directly by gravity from the vaporizer into the cracking chamber, the regeneration of the catalytic agent of the cracking chamber and the regeneration of the absorbent substances employed in the vaporizer being able to be effected simultaneously.

The invention comprises particular means for ensuring, in this form of construction, the removal of the soda and its subsequent recovery.

Various constructions according to the invention are illustrated by way of example on the accompanying drawings, in which:—

Fig. 1 is a longitudinal sectional elevation of a group of apparatus;

Fig. 2 is a sectional elevation of another apparatus;

Fig. 3 is a sectional plan thereof on the line 3—3 of Fig. 2, and

Fig. 4 is a sectional elevation showing a modification.

The group of apparatus shown in Fig. 1, comprises a vaporizer and a catalytic reaction chamber conforming substantially to certain elements disclosed in the aforesaid patent application Serial No. 328,013. This group comprises a vaporizing unit B which may consist for example of a chamber of annular cross section, closed at its two ends and provided, at a given distance from its bottom with a perforated false bottom $B^1$, on which is located a porous substance $b^1$. Above this porous substance, baffles consisting of inclined plates $b$, ensure a preliminary vaporization of the substance to be treated, which is distributed by a pipe A at a suitable temperature, which pipe opens into the annular chamber by means of an annular rose $A^1$ of round cross section. The liquid distributed by the rose mixes with steam admitted by pipes C. Following the vaporizer B is a catalytic reaction chamber E, communicating with the bottom portion of the vaporizer by a pipe D. The vaporized products, after having traversed the catalyst F with which the chamber E is charged, escape through a false bottom $D^1$, in order to be taken off by a pipe G and led to the various successive units of the plant for the purpose of their purification and refining. The porous substance may be pellets or molded elements of china clay or other inert porous absorbent material having little or no polymerizing, depolymerizing or other catalytic activity under the conditions of operation, while the cracking catalyst F consists of adsorbent catalytic material such as an activated silicate with or without other active substances such as nickel, copper or cobalt. The operating temperatures will depend upon the composition of the material being treated and the product to be produced, but is normally within the range of 300° to 550° C. Pressures are preferably substantially atmospheric but desirable results are secured at either super or sub atmospheric pressures.

The units B and E are provided with the arrangements necessary for the regeneration of the porous substance $b^1$ and of the catalyst mass F, and for this purpose the vaporizer B includes an air inlet pipe $b^3$ provided with a stop cock, and an outlet pipe $b^4$ for the residual gases from the regeneration, likewise provided with a stop cock. The catalytic reaction chamber E for its part is provided with pipes H opening into a series of roses $H^1$, suitably distributed throughout the body of the mass, the pipes H leading from a trunk I in common into which opens a pipe J for the admission of a regenerating agent, such as air or oxygen, or other suitable gas.

In accordance with the invention, the porous substance $b^1$ with which the vaporizer is charged, and also the catalyst F with which the reaction chamber E is charged, can be rid of the sulphate of soda which may have retained. For this purpose, a washing liquid or a solvent such as water for example, is admitted either by specially provided separate pipes, or even by the pipes which normally serve for the admission of the gaseous regenerating agents and for the outlet of the gases derived from such regeneration. Thus for the removal of the sulphate of soda with which the porous substance $b^1$ in the vaporizer may have become charged, water can be admitted by the pipe $b^4$ and such water, charged with sulphate of soda, evacuated by the pipe $b^3$ or by a drain pipe $b^2$ already normally provided in the apparatus; or a water supply pipe K having a cock $k$ and which opens into the oil distributing rose $A^1$, may be provided, and the evacuation can be effected by both $b^3$ and $b^2$. Likewise for the removal of the sulphate of soda with which the catalyst F may have become charged, the washing liquid can be admitted by the pipe J and evacuated by a trapped pipe $j$, or a water supply pipe L may be provided on the trunk I, the liquid being distributed thoroughly by the roses $H^1$ which serve normally for the distribution of the gaseous regenerator. In this form of construction, the washing of the porous substance of the vaporizer can be effected at suitable intervals, the washing of the catalyst being necessary only occasionally and at much longer intervals.

Figs. 2 and 3 show the application of the invention to a combined vaporizer and catalytic reaction chamber unit in accordance with the particular form of construction referred to above in connection with United States application Serial No. 516,159.

In this example, the combined vaporizer and catalytic reaction chamber, consists of a casing the lower portion of which is reserved more particularly for the catalytic reaction, whereas in the superposed top portion normally in direct communication with the bottom portion, is effected a previous vaporization of the oil to be treated admixed with steam. E denotes the catalytic reaction chamber of parallelepiped form on which is superposed an element B forming the vaporizing chamber.

In this case, the catalyst mass F of the reaction chamber and the porous mass $b^1$ of the vaporizer, serving to perfect the vaporization, form a continuous whole. In the top portion of the vaporizer there are, as in the preceding example, baffles $b$, formed by metal plates over which flows in thin layers the oil supplied by a pipe A and distributed by a rose $A^1$. C denotes the steam supply pipe. These superposed elements E and B are, as previously indicated, provided with piping for the regeneration or the reactivation of the catalyst or of the porous mass. In the chamber E are located a series of perforated pipes $H^1$ extending from a trunk I in common to which the regenerating agent is led by the pipe J provided with a stop cock.

The regeneration by a gaseous stream is effected simultaneously in the lower element E and in the upper element B, the gases derived from such regeneration of the whole escape by the pipe $b^3$ provided with a stop cock.

As stated above, it is mainly the porous substance $b^1$ of the vaporizer which becomes charged with alkaline salts such as sulphate of soda, and it is mainly in the upper element B that it is advisable to effect periodical washing with water or other suitable solvent. According to the invention, in order to avoid the liquid for washing the porous substance $b^1$ penetrating into the reaction chamber during washings effected in the vaporizer B, there can be provided, as shown in Figs. 2 and 3, at the bottom of the element B or in the communication chamber between the elements B and E, a liquid intercepter and collector M provided with a perforated false bottom $m$; the washing water can be admitted either by the outlet pipe $b^3$ for the regeneration gases, or by a pipe K, the solvent charged with sulphate of soda passing away by a pipe N leading from the bottom of the collector M and provided with a stop cock $n$. Thus little or very little of the solvent liquid during the washing operation is able to filter between the borders of the collector M and the walls of the communication chamber between B and F. The evacuation of the washing liquid to outside the vaporizer B through the pipe N can, if desired, be promoted by suction by means of an ejector or pump. Normally the pipe N can serve for the admission of air for regeneration into the vaporizer B.

For the eventual periodic washing, and at longer intervals, of the catalytic reaction chamber E, a water inlet pipe K¹ can be provided opening into the normal inlet pipe J for air for regeneration, and at the extreme bottom of the chamber E, an outlet pipe O, or the existing drain pipe may be used.

Fig. 4 shows in diagrammatic sectional elevation a modification in which the fixed collector M for the liquid, is replaced by a withdrawable collector or by a simple register P capable of being set alternatively in an operative position wherein it closes the bottom of the chamber B or in a withdrawn position wherein it is housed in a chamber B² projecting from the said chamber B. False bottoms B³ and B⁴, permitting the free circulation of gases and liquids may, in this case, be disposed on both sides of the path of the register or withdrawable collector P. Obviously, the perforations of these false bottoms should be of a size sufficiently small to prevent the passage therethrough of the porous bodies which constitute the charge of the vaporizer B.

What is claimed is:

1. The process of regenerating porous inert or catalytically active material contaminated by the treatment of soda tars and similar residues of the petroleum industry, which comprises subjecting the contaminated material to an oxidizing agent and thereafter subjecting it to the action of a solvent for the contaminators not already removed by the oxidizing agent.

2. In the treatment of soda treated tars and other similar residues of the petroleum industry, the process for the elimination of contaminating material from a porous mass wherein the tars have been vaporized and from a catalytic mass used for subsequent treatment, said process comprising subjecting both masses to the action of an oxidizing agent and thereafter subjecting one or both of said masses to a solvent and applying the solvent to the catalytic mass less frequently than to the porous mass.

3. The process of regenerating porous inert or catalytically active material containing flammable and other deposits from the treatment of soda tars and similar residues of the petroleum industry, which comprises first burning out the flammable deposits and then washing out by means of solvents any remaining nonflammable contaminators.

4. The process of regenerating porous inert or catalytically active material used in the treatment of soda tars and similar residues of the petroleum industry, which comprises burning out flammable deposits and then washing out with a suitable solvent the non-flammable deposits.

5. In the conversion of soda-treated tars and other residues of the petroleum industry, the process which comprises vaporizing the tar in contact with a porous mass, subjecting the vaporized tar to the action of an adsorbent catalytic mass, stopping the feeding of tar, eliminating carbon and other flammable deposits from both masses by combustion before renewing the feeding of tar, and utilizing, at frequent intervals after the combustion step and before renewal of the feeding of tar, a solvent to remove other deposits from both masses.

6. In the conversion of soda-treated tars and other residues of the petroleum industry, the process which comprises vaporizing the tar in contact with a porous mass, subjecting the vaporized tar to the action of an adsorbent catalytic mass, stopping the feeding of tar, eliminating carbon and other flammable deposits from both masses by combustion before renewing the feeding of tar, and utilizing, at frequent intervals after the combustion step and before renewal of the feeding of tar, a solvent to remove other deposits from both masses but applying the solvent to the porous mass more frequently than to the catalytic mass.

7. In the regeneration in situ of catalytic material contaminated with carbonaceous and alkaline deposits, the process which comprises passing a gaseous mixture containing oxygen thereover under oxidizing conditions and thereafter applying a washing liquid thereto.

8. In the conversion of heavy hydrocarbons such as soda treated tars and other residues involving vaporization of the same in contact with inert absorbent material and cracking of the hydrocarbon in contact with catalytic material with alternate periods of operation and regeneration, the process of regeneration which comprises freeing said materials of deposits first by oxidation and thereafter by washing with a liquid solvent and applying the liquid solvent to the absorbent material more frequently than to the catalytic material.

9. In apparatus for affecting chemical transformations of hydrocarbons, a casing providing interconnecting chambers in superposed relation, contact masses in both said chambers, means for admitting liquid to the upper of said chambers to wash the contact mass therein, and means for withdrawing said liquid from said casing without its contacting the contact mass in the lower chamber.

10. In apparatus for affecting chemical transformations of hydrocarbons, a casing providing interconnecting chambers in superposed relation, contact masses in both said chambers, means for supplying an oxidizing agent to both chambers, means for admitting liquid independently to said chambers for washing the contact masses therein, and means for keeping the liquid supplied to the upper of said chambers out of the lower of said chambers.

11. In apparatus for the conversion of hydrocarbons, a casing providing interconnecting chambers in superposed relation, the upper or vaporizing chamber having a mass of absorbent material therein and said lower or cracking chamber having a mass of catalytic material therein, means for distributing throughout said catalytic mass a gaseous oxidizing agent, venting means above said absorbent mass for said agent, and means for flushing one of said masses with a solvent liquid.

12. In apparatus for the conversion of hydrocarbons, a casing providing interconnecting chambers in superposed relation, the upper or vaporizing chamber having a mass of absorbent material therein and said lower or cracking chamber having a mass of catalytic material therein, means for subjecting both of said masses to a gaseous oxidizing agent, and means for flushing said masses independently of each other with a liquid.

13. In apparatus for the conversion of hydrocarbons, a casing providing interconnecting chambers in superposed relation, the upper or vaporizing chamber having a mass of absorbent material therein and said lower or cracking chamber having a mass of catalytic material therein, means for supplying liquid to said upper chamber to wash said absorbent mass, and means for keeping said liquid out of contact with said catalytic mass.

14. In apparatus for the conversion of hydrocarbons, a casing providing interconnecting chambers in superposed relation, the upper or vaporizing chamber having a mass of absorbent material therein and said lower or cracking chamber having a mass of catalytic material therein, means for supplying liquid to said upper chamber to wash said absorbent mass, and collecting means interposed between said masses for keeping said liquid out of contact with said catalytic mass and for removing said liquid from said casing.

15. In apparatus for the conversion of hydrocarbons, a casing providing interconnecting chambers in superposed relation, the upper or vaporizing chamber having a mass of absorbent material therein and said lower or cracking chamber having a mass of catalytic material therein, means for supplying liquid to said upper chamber to wash said absorbent mass, and a movable collector arranged to be interposed between said masses to keep said liquid out of contact with said catalytic mass.

16. In apparatus for the conversion of hydrocarbons, a casing providing interconnecting chambers in superposed relation, the upper or vaporizing chamber having a mass of absorbent material therein and said lower or cracking chamber having a mass of catalytic material therein, means for supplying liquid to said upper chamber to wash said absorbent mass, means between said chamber for keeping said liquid out of contact with said catalytic mass, but permitting movement of gases and vapors between said chambers.

17. Apparatus for the conversion of hydrocarbons comprising a casing containing a mass of contact material, said casing providing an upper chamber and a trunk having a series of distributing conduits extending therefrom and embedded in said mass, a plurality of supply lines connected to said trunk for feeding thereto both gases and liquid regenerating fluids, and outlet connections from both the top and bottom of said chamber for the removal of said fluid and the products of the regenerating operations.

EUGENE HOUDRY.